US008028311B2

(12) United States Patent
Gilovich

(10) Patent No.: US 8,028,311 B2
(45) Date of Patent: Sep. 27, 2011

(54) MULTIPLE POSITIONER DATA STORAGE DEVICE

(76) Inventor: Paul A. Gilovich, Reno, NV (US)

( * ) Notice: Subject to any disclaimer, the term of this patent is extended or adjusted under 35 U.S.C. 154(b) by 1200 days.

(21) Appl. No.: 11/665,104

(22) PCT Filed: Oct. 17, 2005

(86) PCT No.: PCT/US2005/037411
§ 371 (c)(1),
(2), (4) Date: Apr. 10, 2007

(87) PCT Pub. No.: WO2006/044884
PCT Pub. Date: Apr. 27, 2006

(65) Prior Publication Data
US 2009/0013342 A1    Jan. 8, 2009

Related U.S. Application Data

(60) Provisional application No. 60/620,055, filed on Oct. 18, 2004, provisional application No. 60/644,648, filed on Jan. 18, 2005, provisional application No. 60/701,471, filed on Jul. 22, 2005.

(51) Int. Cl.
*G11B 17/028*    (2006.01)

(52) U.S. Cl. ....................................................... 720/699
(58) Field of Classification Search .................. 720/699, 720/672, 619, 711, 695, 615; 360/264.4, 360/265.2, 265.6, 264.3, 246.7, 266.6
See application file for complete search history.

(56) References Cited

U.S. PATENT DOCUMENTS

| | | | | |
|---|---|---|---|---|
| 5,054,015 A * | 10/1991 | Tsukihashi et al. | ........... | 720/695 |
| 5,331,488 A * | 7/1994 | McAllister et al. | ........ | 360/98.08 |
| 5,343,347 A * | 8/1994 | Gilovich | .................... | 360/246.7 |
| 5,455,723 A | 10/1995 | Boutaghou et al. | | |
| 5,557,152 A | 9/1996 | Gauthier | | |
| 6,009,063 A * | 12/1999 | Nguyen et al. | ............. | 369/13.34 |
| 6,115,215 A * | 9/2000 | Adams et al. | ............... | 360/264.4 |
| 6,996,034 B1 * | 2/2006 | Taniguchi et al. | ......... | 369/30.52 |
| 2003/0133371 A1 * | 7/2003 | Mabuchi | .................... | 369/30.93 |
| 2007/0177297 A1 * | 8/2007 | Lai et al. | .................... | 360/99.12 |
| 2007/0206308 A1 * | 9/2007 | Bates et al. | ..................... | 360/55 |

* cited by examiner

*Primary Examiner* — Allen Cao
(74) *Attorney, Agent, or Firm* — Emery L. Tracy

(57) ABSTRACT

An optical data storage device having at least two removable rotatable disks and at least one actuator assembly for writing data onto each side of the disks and reading the data recorded on each side of the disks is provided. The disks are rotated by a dual stator/dual rotor spindle motor. The actuators are driven by a dual coil/dual moving magnet actuator.

12 Claims, 19 Drawing Sheets

US 8,028,311 B2

MULTIPLE POSITIONER DATA STORAGE DEVICE

The present application is a continuation of PCT/US2005/037411, filed Oct. 17, 2005, which claims benefit of priority of U.S. Provisional Patent Application Ser. No. 60/620,055, filed on Oct. 18, 2004, U.S. Provisional Patent Application Ser. No. 60/644,648, filed on Jan. 18, 2005, and U.S. Provisional Patent Application Ser. No. 60/701,471, filed on Jul. 22, 2005.

BACKGROUND OF THE INVENTION

1. Field of the Invention

This invention relates generally to a multiple positioner data storage device and, more particularly, the invention relates to a multiple positioner data storage device having fixed and/or removable media with single positioner and multiple positioners per media side.

2. Description of the Prior Art

Generally, a disk drive is used as an auxiliary memory device in a computer. The disk drive includes at least one disk which is rotated at a high speed by a spindle motor, and a single actuator arm assembly which rotates in response to a voice coil motor about a pivot point for moving a magnetic head on an actuator arm that writes data onto the tracks of the disk and reads the data recorded on the tracks of the disk. The magnetic head is located on a leading end of a head gimbals, which typically moves along both sides of the disk, wherein the magnetic head is influenced by an airflow generated on a surface of the disk as the disk rotates at a high speed to maintain a minute gap between the magnetic head on the actuator arm and the disk.

The elements of the disk drive are typically positioned within a base plate housing covered by a top plate. Both the actuator arm assembly and the spindle motor are attached to the base plate housing. Furthermore, in an attempt to seal the interior of the disk drive from foreign material and other debris, a gasket is positioned between the base plate and the housing. Due to the necessity of maintaining the disks in a "clean environment", the disks in a disk drive are not removable from the disk drive by a consumer without damaging data.

Conventional rewritable DVD's are typically removable. At present, the conventional rewritable DVD's and rewritable magneto optical disks are typically single sided and, at the present time, to utilize all rewritable optical disks as fixed disks, the dual sided, fixed disks are generated by bonding two single sided disks together forming the dual sided, fixed disks.

Accordingly, there exists a need for a multiple positioner data storage device using multiple positioners. Additionally, a need exists for a multiple positioner data storage device having a fixed disk drive and removable media combined.

SUMMARY

The present invention includes a data storage device having at least one rotatable disk and at least one actuator arm assembly for writing data onto the disk and reading the data recorded on the disk. The data storage device comprises a first plate with the spindle motor being secured only to the first plate. A first actuator arm assembly is secured only to the first plate. A second plate is secured to the first plate. A second actuator arm assembly secured only to the second plate.

The present invention further includes a data storage device comprising at least one disk rotated by a spindle motor. At least two positioners are rotatable about a common pivot point for writing data onto the tracks of the disk and reading the data recorded on the tracks of the disk with the positioners being planar with one another. A moving magnet, dual voice coil motor moves the positioner.

The present invention further still includes a data storage device comprising a first fixed disk, at least one removable disk, and at least two positioners reading data from and writing data to each side of the fixed disk and the removable disks.

The present invention further yet includes a data storage device comprising a rotatable disk, a first positioner for reading data from and writing data to the disk, and a second positioner for reading data from and writing data to the disk wherein the first positioner faces the second positioner.

DETAILED DESCRIPTION OF THE PREFERRED EMBODIMENTS

Figure 1A:
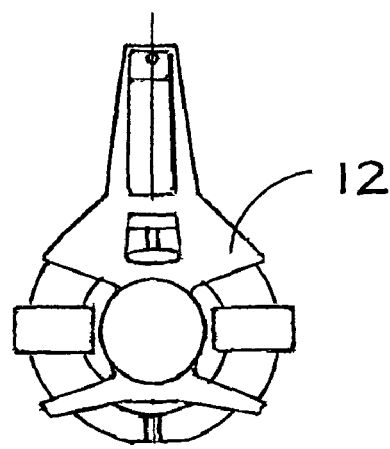
FIG. 1a is a top plan view illustrating a single positioner having laser or magnetic transducers of a multiple drive device, constructed in accordance with the present invention.
Figure 1D:
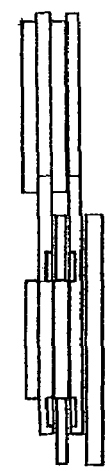
FIG. 1d is a side view illustrating a dual arm for laser assembly or single arm for magnetic transducers of the multiple drive device, constructed in accordance with the present invention.
Figure 1B:
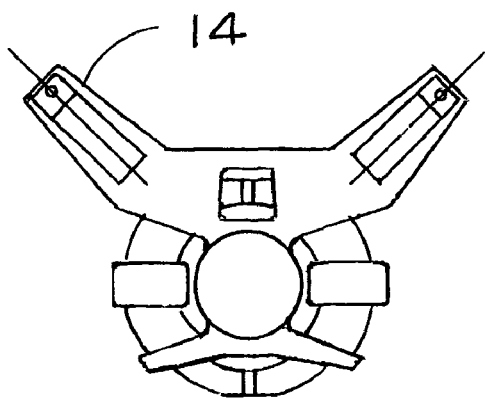
FIG. 1b is a top plan view illustrating a dual positioner having laser or magnetic transducers of the multiple drive device, constructed in accordance with the present invention.
Figure 1E:
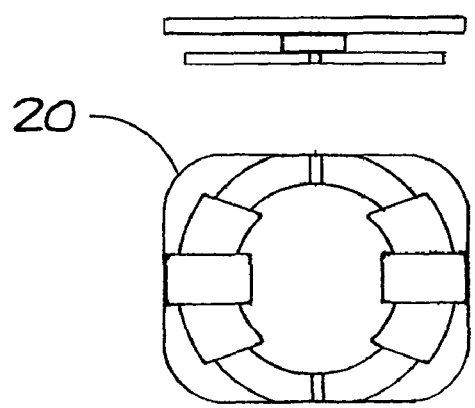
FIG. 1e is a top plan view illustrating moving magnet return plates of the multiple drive device, constructed in accordance with the present invention.
Figure 1F:
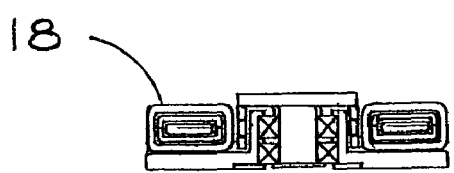
FIG. 1f is a sectional side view illustrating dual, heat-sinked coils of the multiple drive device, constructed in accordance with the present invention.
Figure 1C:
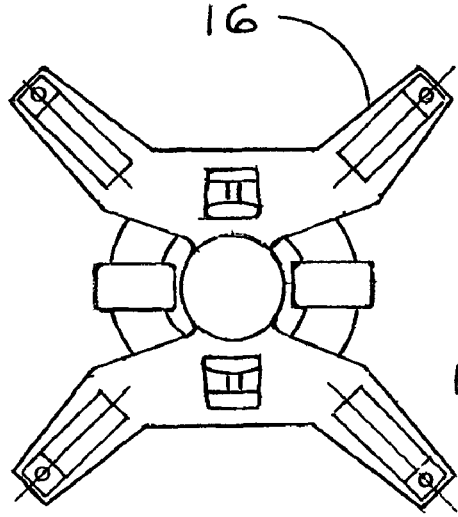
FIG. 1c is a top plan view illustrating a quad positioner having laser or magnetic transducers of the multiple drive device, constructed in accordance with the present invention.

As illustrated in FIGS. 1-9, the present invention is a new and improved multiple positioner drive device, indicated generally at 10, for fixed and removable media disks. Preferably, the fixed and removable media disks are magnetic hard drive disks, rewritable DVD optical disks, rewritable magneto optical disks, or rewritable holographic disks. Basically, the present invention includes, but is not limited to, multiple positioner hard disk drives, DVD drives, CD drives, magnetic optical drives, and/or holography disk drives. It should be noted, depending on the size of the disks, the actual number of positioners within the drive device can be infinite.

As illustrated in FIGS. 1a-1f, the multiple positioners drive device 10 of the present invention can have having single arm 12, dual arm actuators 14, and quad arm actuators 16. The actuators 12, 14, 16 have a moving shaft, multiple arms, dual stationary coils 18, and dual coil moving magnets 20. With dual coil moving magnet actuators, the magnets 18 have more coil turns than conventional brush type moving coil motors. In addition, with the dual coil moving magnet actuators having the two coils 18 placed on opposite sides of the actuator pivot, the resonances at the pivot are eliminated causing a resonant free actuator.

Figure 2A:
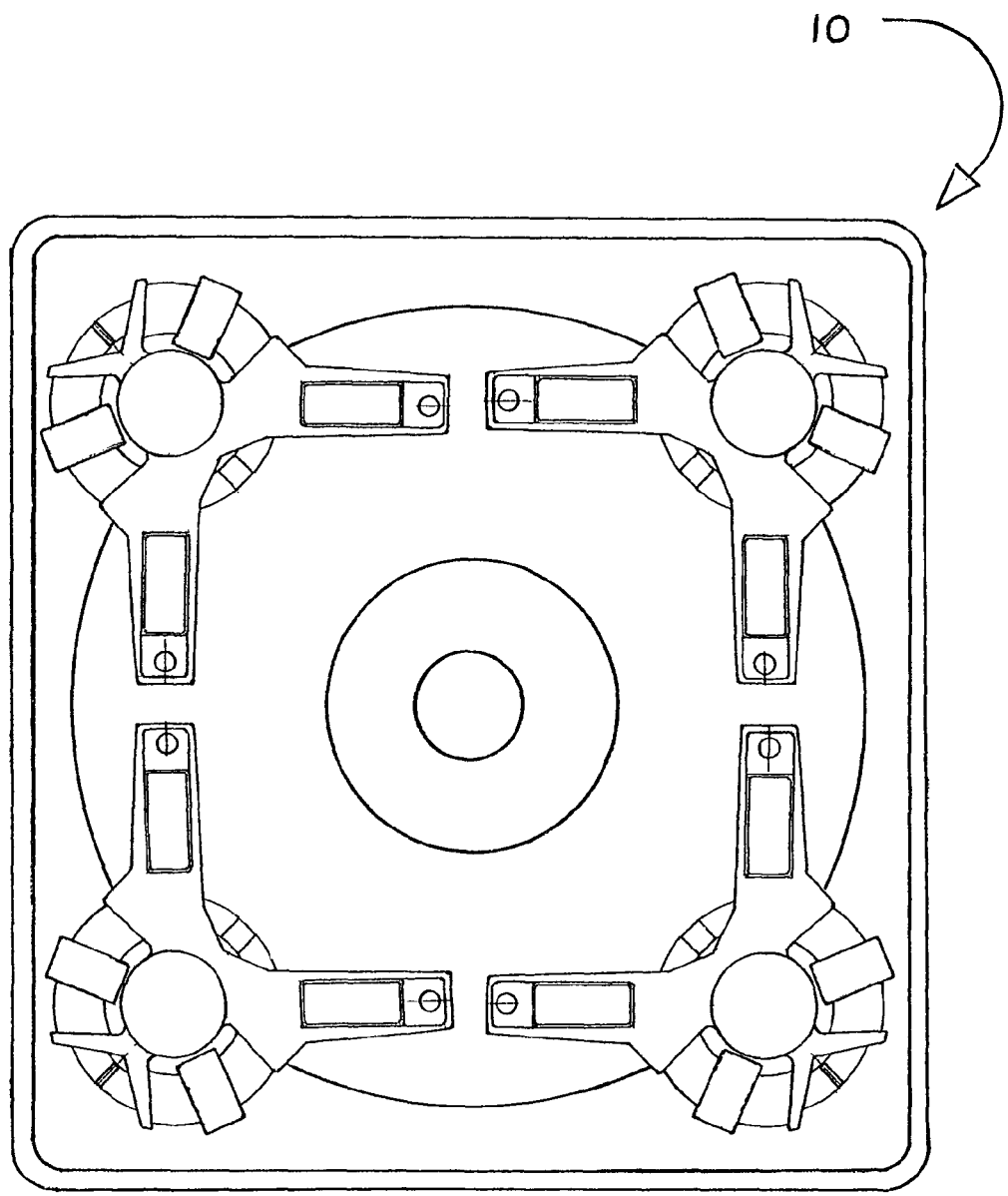
FIG. 2a is a top plan view illustrating an embodiment of the multiple drive device, constructed in accordance with the present invention.
Figure 2A:
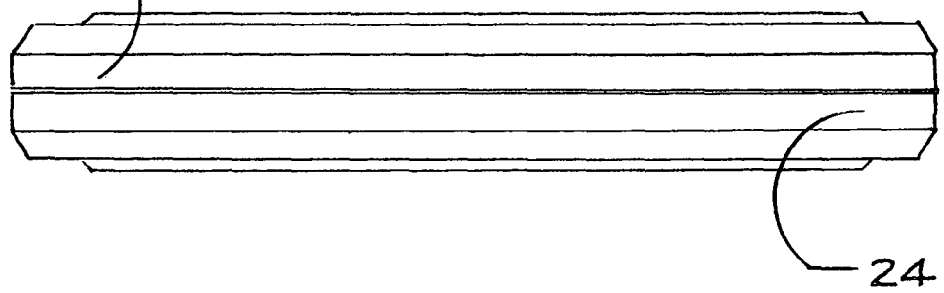
Figure 2B:
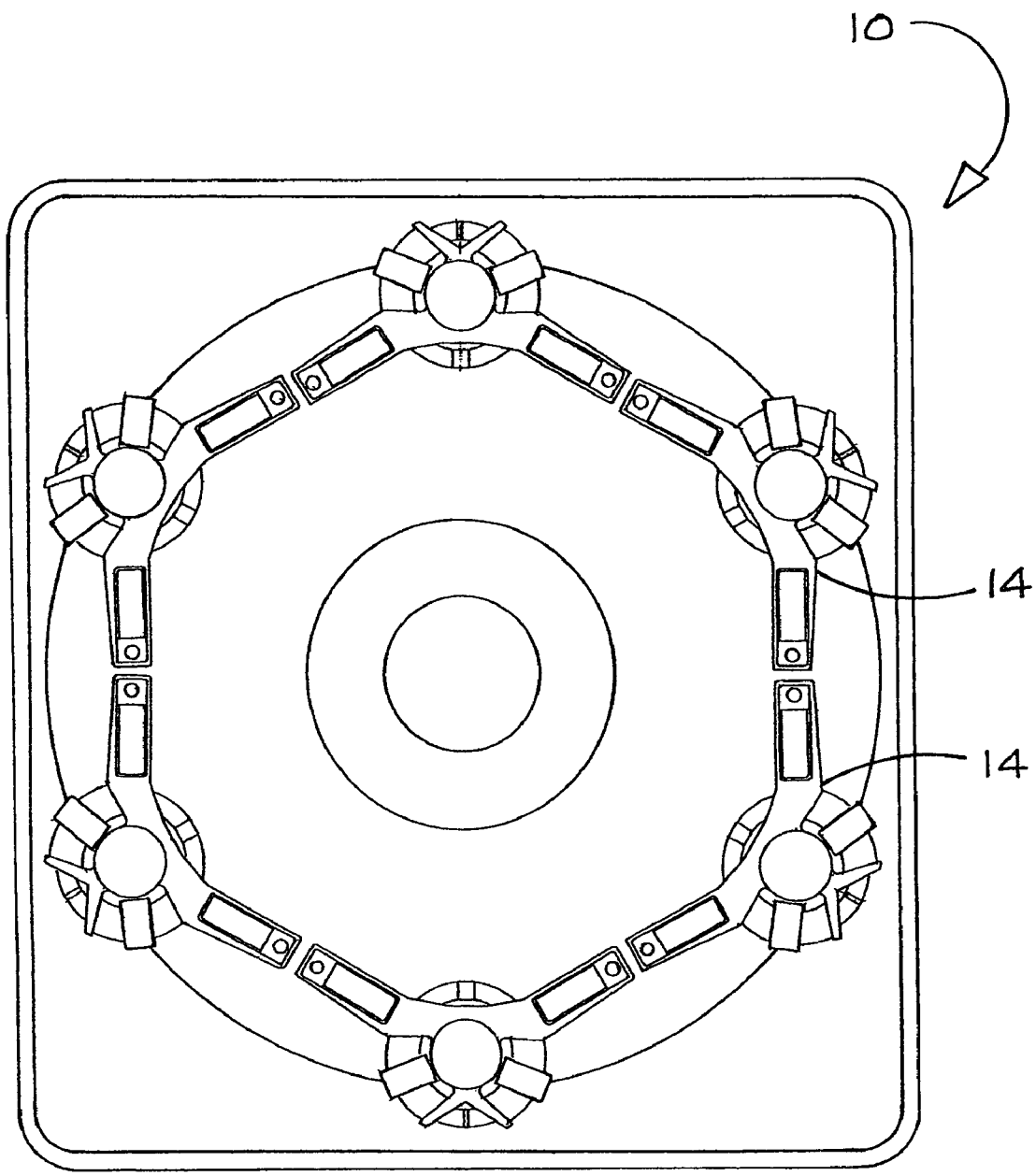
FIG. 2b is a top plan view illustrating another embodiment of the multiple drive device, constructed in accordance with the present invention.

As illustrated in FIGS. 2a and 2b, the multiple positioner device 10 of the present invention has single aim actuators 12 and dual arm actuators 14. The positioner devices 12, 14 are complete assemblies and the stator/rotor/bearing spindle completes the assembly. Both types of actuators are integral with the top plate 22 and both are integral with the bottom plate 24.

FIG. 2a illustrates a mini DVD media with multiple single coil/magnet positioners 14 (one (1) to eight (8)) and blue laser transducers with thirty (30) gigabytes per side minimum. This multiple positioner device 10 is designed as a replacement for all existing magnetic hard drives in laptops.

FIG. 2b illustrates a standard size DVD media with multiple single coil/magnet positioners 14 (one (1) to twelve (12)) and blue laser transducers with fifty (50) gigabytes per side minimum. This multiple positioner device 10 is designed as a replacement for all existing magnetic hard drives in existing PC's, workstations, graphics, servers, SAN's, blades, and RAID devices.

Figure 3A:
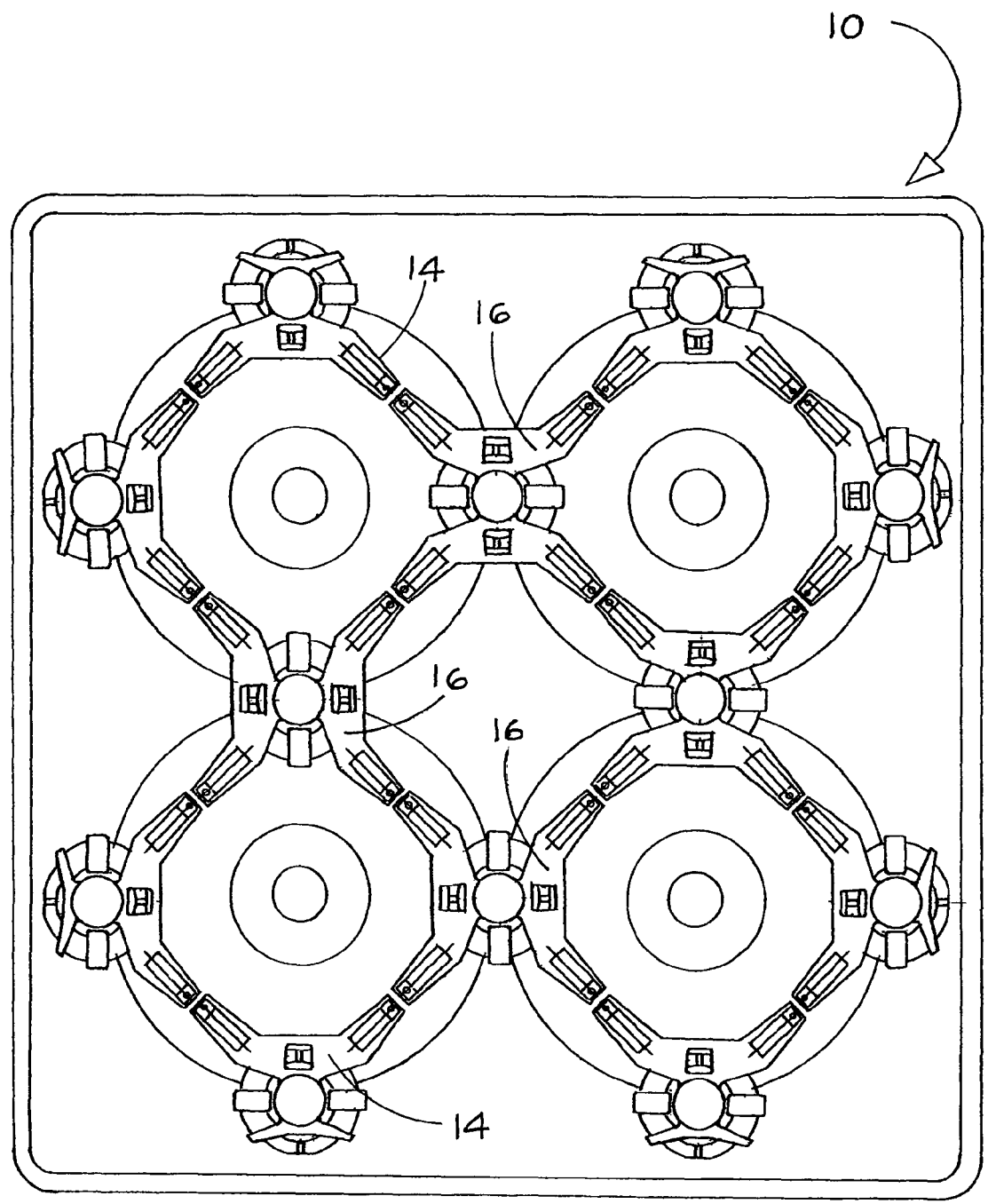
FIG. 3a is a top plan view illustrating still another embodiment of the multiple drive device, constructed in accordance with the present invention.
Figure 3B:
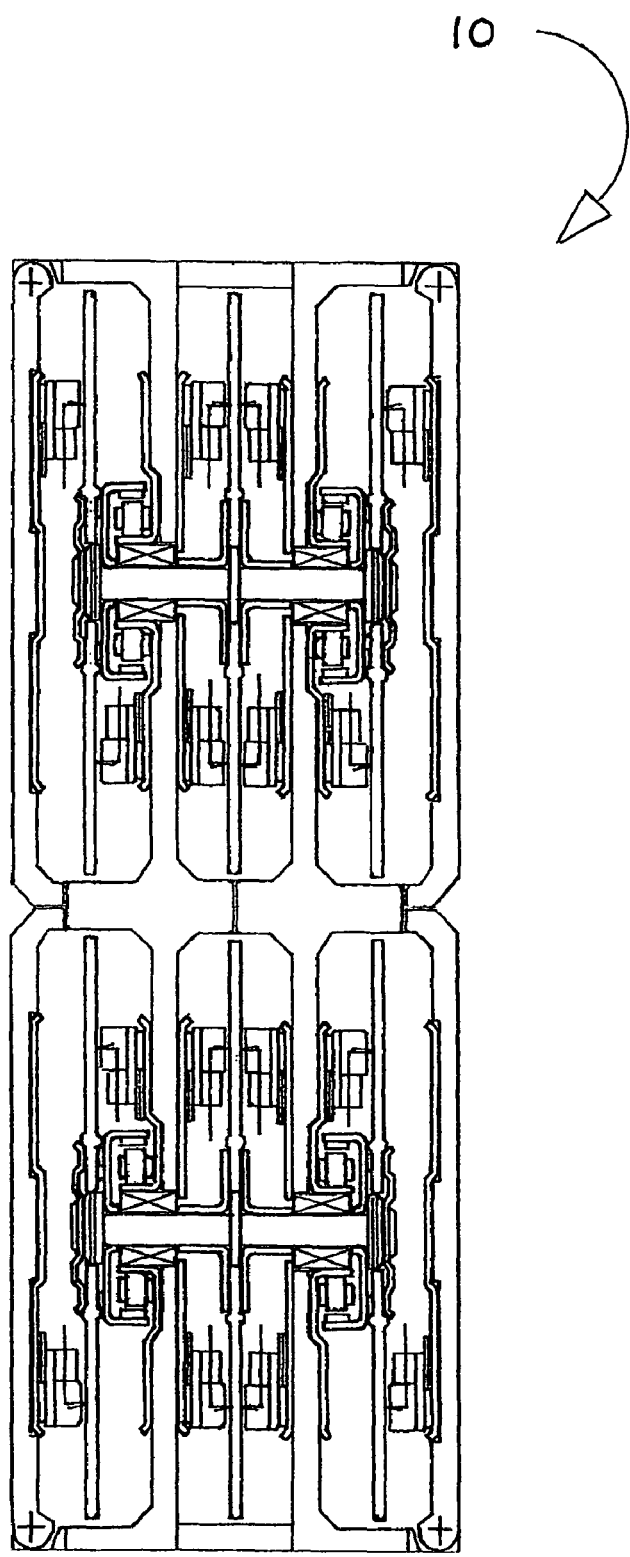
FIG. 3b is sectional side view illustrating the embodiment of the multiple drive device of FIG. 3a, constructed in accordance with the present invention.
Figure 3C:
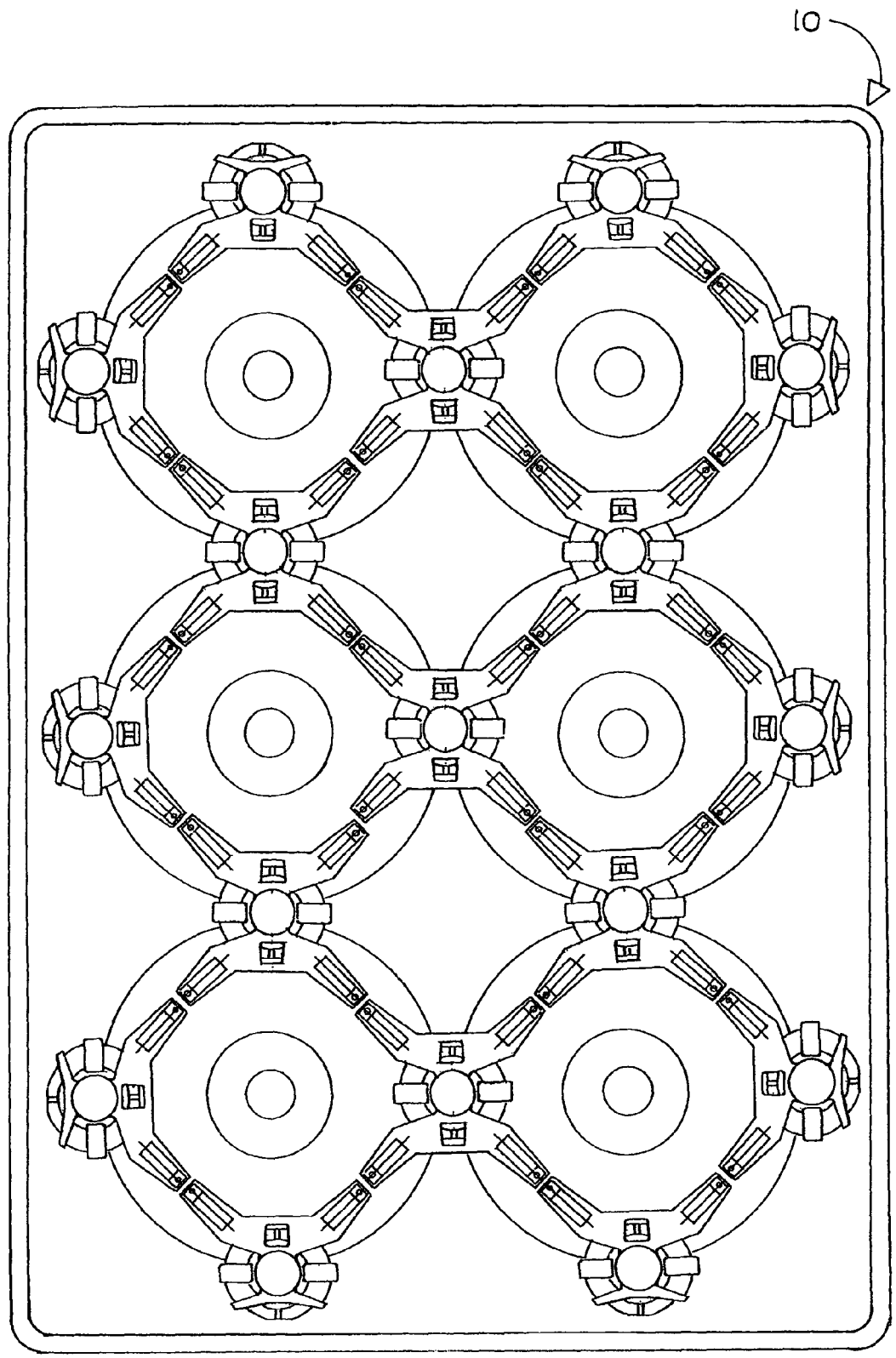
FIG. 3c is a top plan view illustrating yet another embodiment of the multiple drive device, constructed in accordance with the present invention.

As illustrated in FIGS. 3a-3c, the multiple positioner dive 10 has multiple spindles plus two arm 14 and four arm multiple positioners 16 utilizing mini DVD and/or standard DVD media with blue lasers with thirty (3) gigabytes minimum per side or fifty (50) gigabytes per side.

The four arm multiple positioner device 10 illustrates standard DVD media, four fixed disks with eight four arm positioners 16, eight removable disks with one or two dual arm positioners 14 per side, capacity for the fixed media is 400 gigabytes, and capacity for the eight removable media is 800 gigabytes. Using four fixed disks only, this device would generate 6,400 I/O's per second with latency in the micro second range.

Figure 4A:
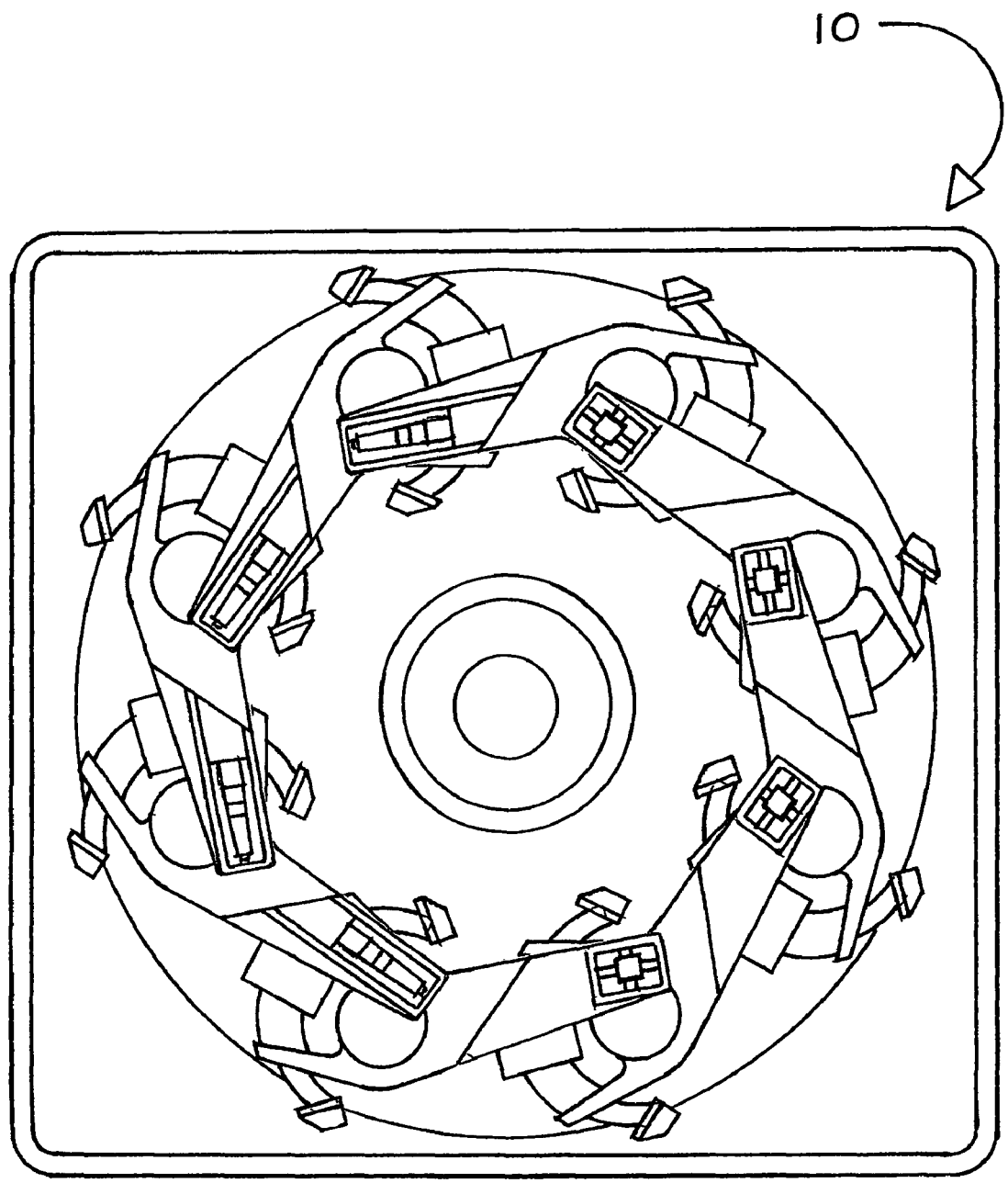
FIG. 4a is a top plan view illustrating still yet another embodiment of the multiple drive device, constructed in accordance with the present invention.
Figure 4B:
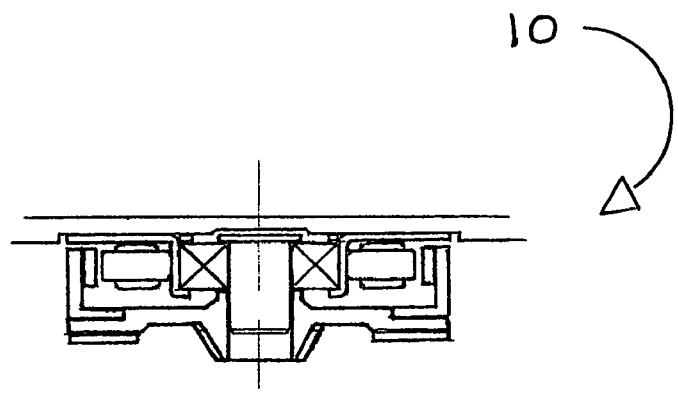
FIGS. 4b-4d are sectional side views illustrating the embodiment of the multiple drive device of FIG. 4a, constructed in accordance with the present invention.
Figure 4C:
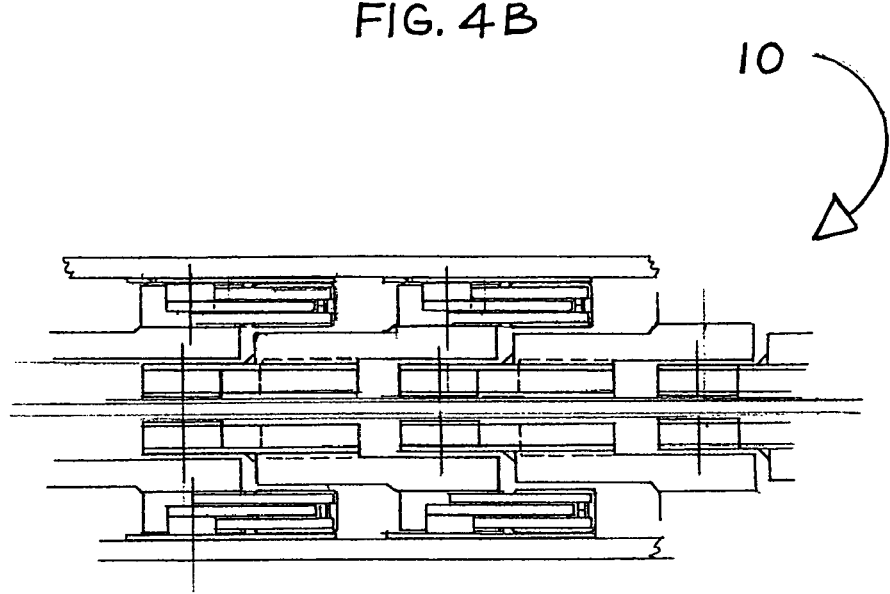
Figure 4D:
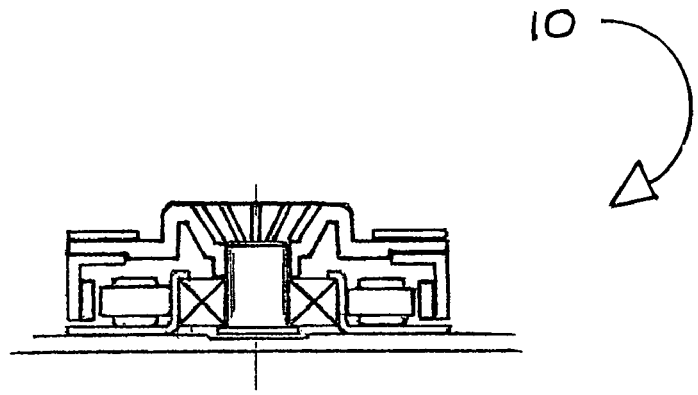
Figure 5A:
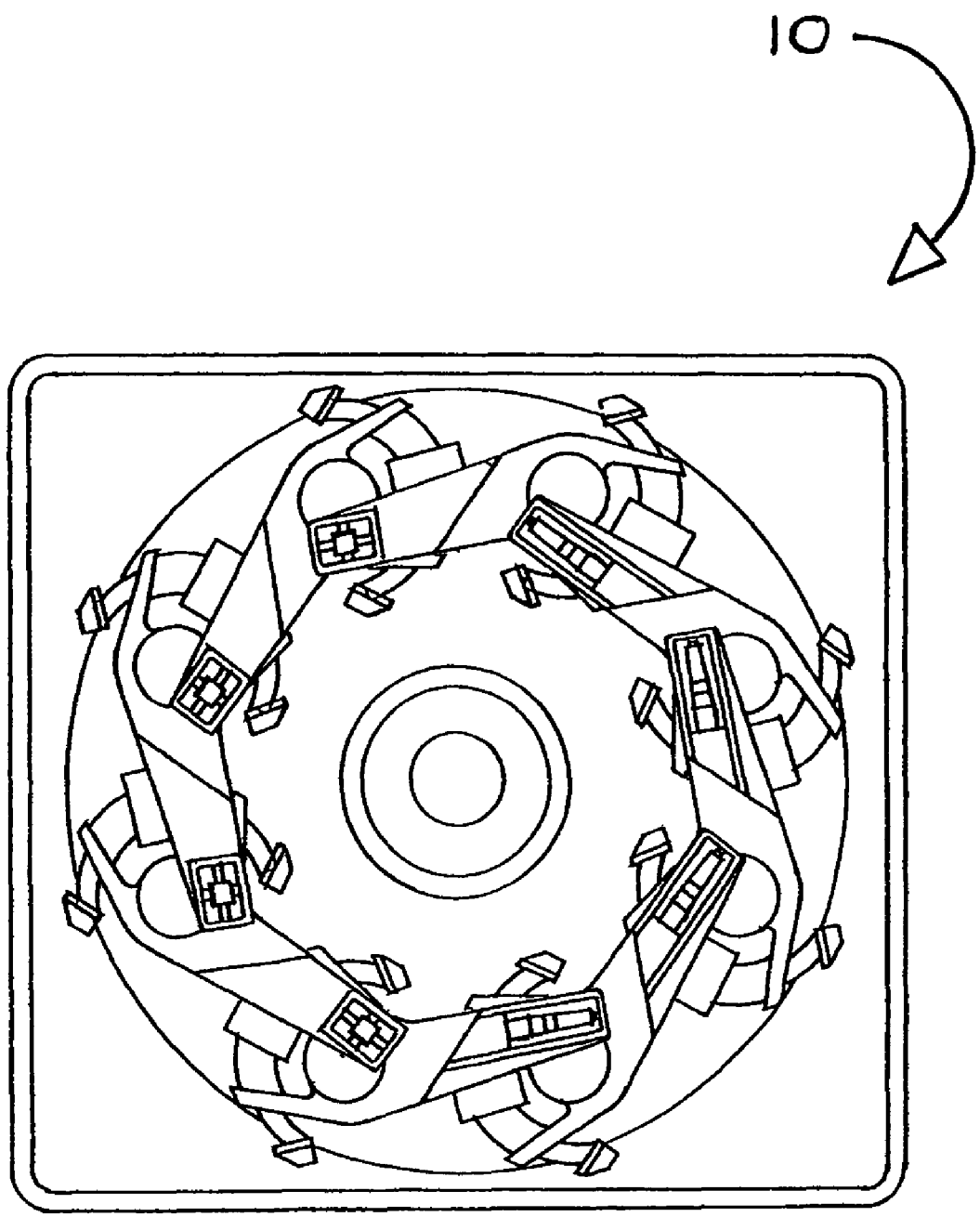
FIG. 5a is a top plan view illustrating another embodiment of the multiple drive device, constructed in accordance with the present invention.
Figure 5B:
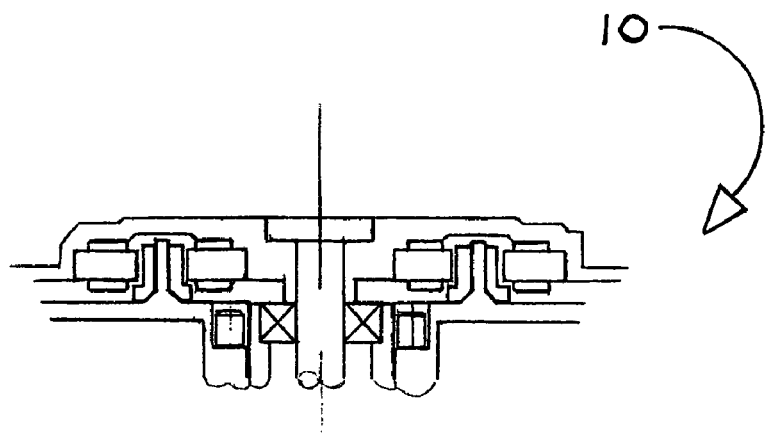
FIGS. 5b-5d are sectional side views illustrating the embodiment of the multiple drive device of FIG. 5a, constructed in accordance with the present invention.
Figure 5C:
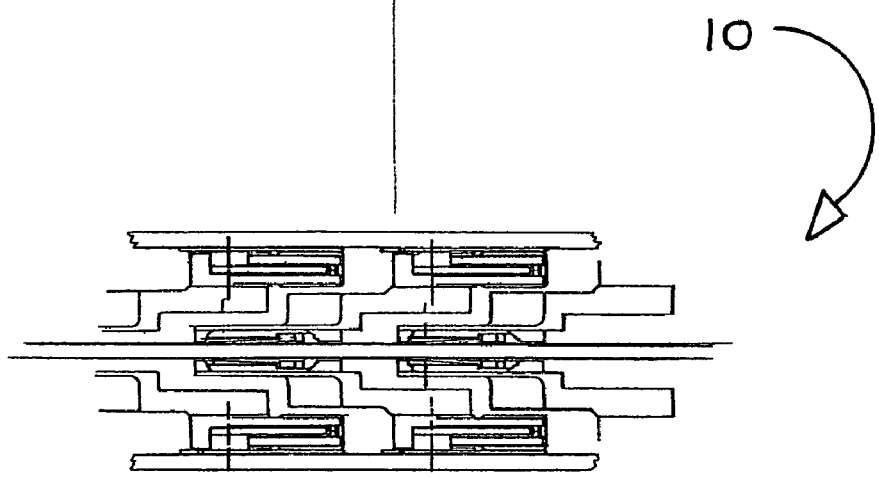
Figure 5D:
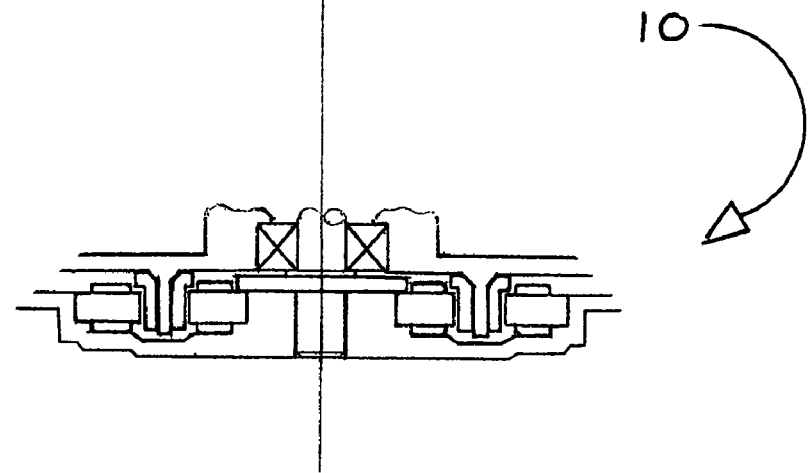
Figure 5E:
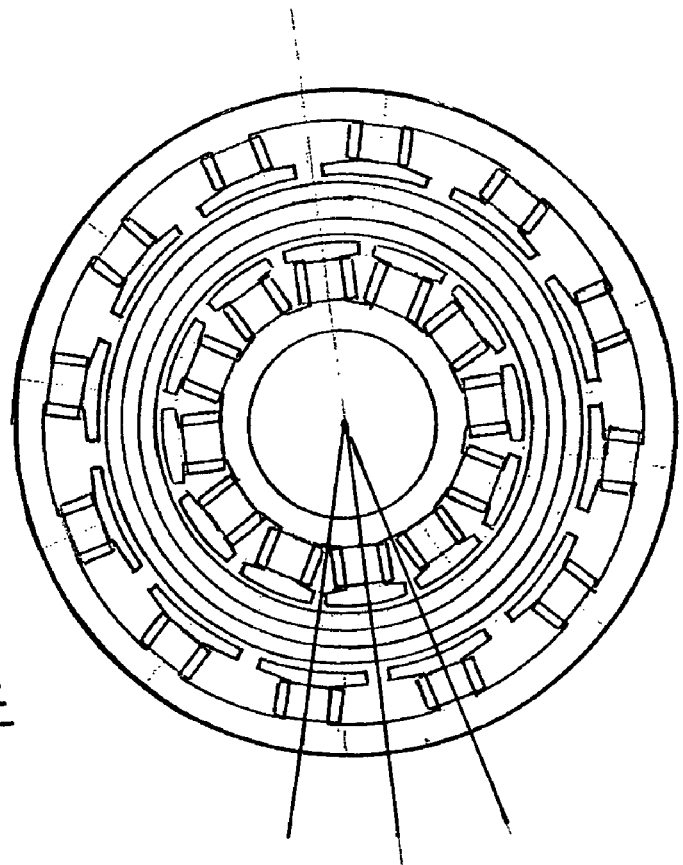
FIG. 5e is a top plan view illustrating a dual rotor/stator arm of the multiple drive device, constructed in accordance with the present invention.
Figure 5F:
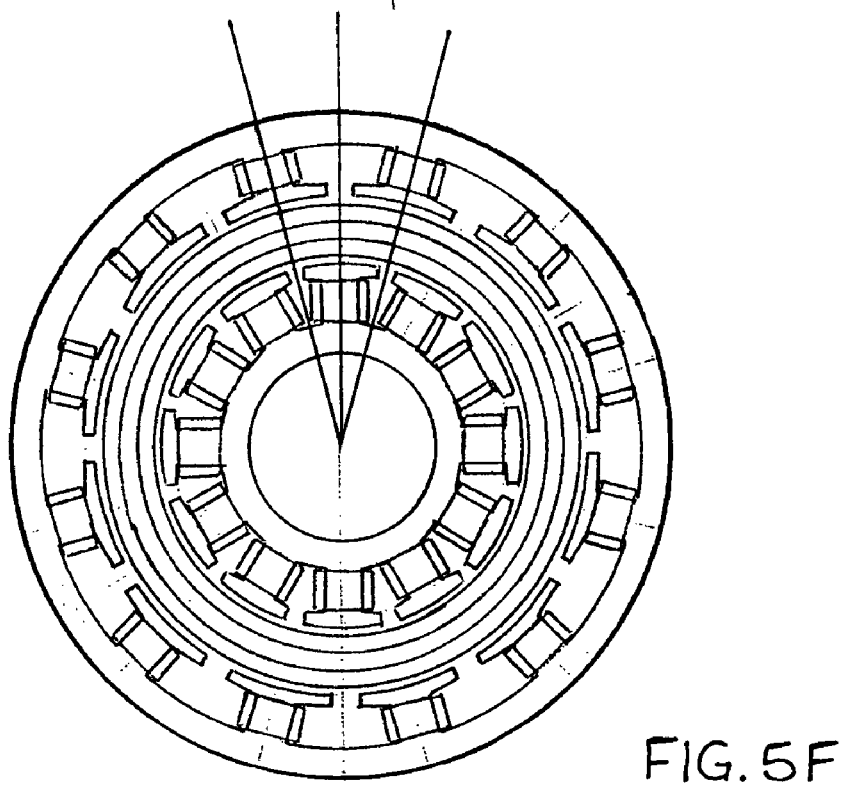
FIG. 5f is a bottom plan view illustrating the dual rotor/stator arm of the multiple drive device, constructed in accordance with the present invention.

As illustrated in FIGS. 4a-4b, the multiple positioner device 10 can be a full size DVD, magneto optical, or holographic drives. Each drive has between one (1) and eight (8) positioners mounted on both the top plate 22 and the bottom plate 24. The total number of positioners can be between two (2) positioners and sixteen (16) positioners. The devices 10 can include interlocking dual stator/rotor spindle motor(s). In addition, the multiple positioner device 10 can include a split spindle and quad spindle motor.

As illustrated in FIGS. 5a-5f, the multiple positioner device 10 drive of the present invention has between one (1) and eight (8) positioners mounted on both the top plate 22 and the bottom plate 24. The total number of positioners can be between two (2) positioners and sixteen (16) positioners. The devices 10 can include quad stator/rotor spindle motor(s). Typical form factors include 5¼ inches, 3½ inches, 2½ inches, 1.8 inches, 1.0 inch, and sub-1.0 inch.

Figure 6A:
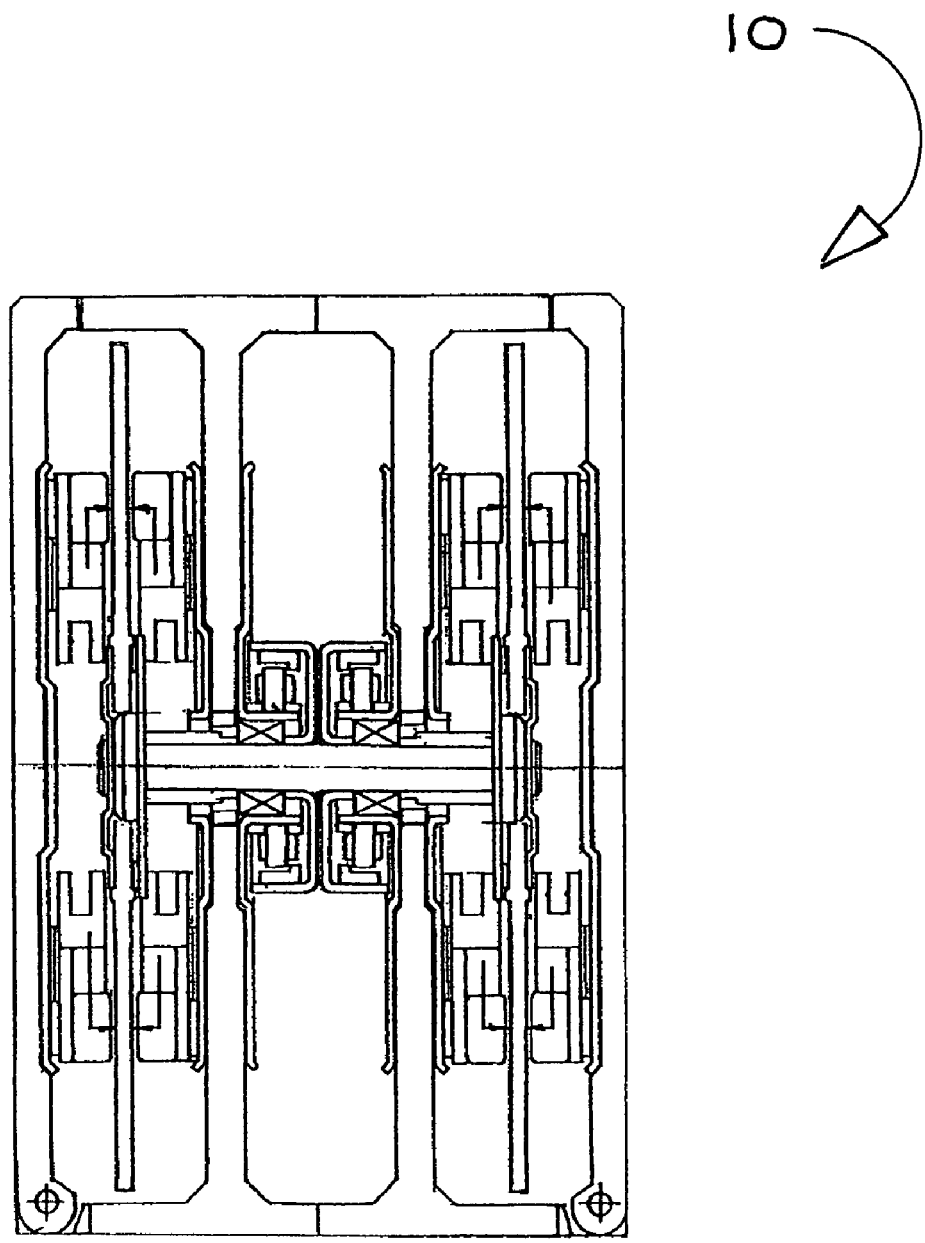
FIG. 6a is a sectional side view illustrating the multiple positioner drive, constructed in accordance with the present invention, having a single fixed disk, two (2) removable disks, a minimum of two (2) positioners per side, and a dual stator/rotor spindle motor with a single shaft and each of the two (2) removable disks having multiple positioners on both sides.
Figure 6B:
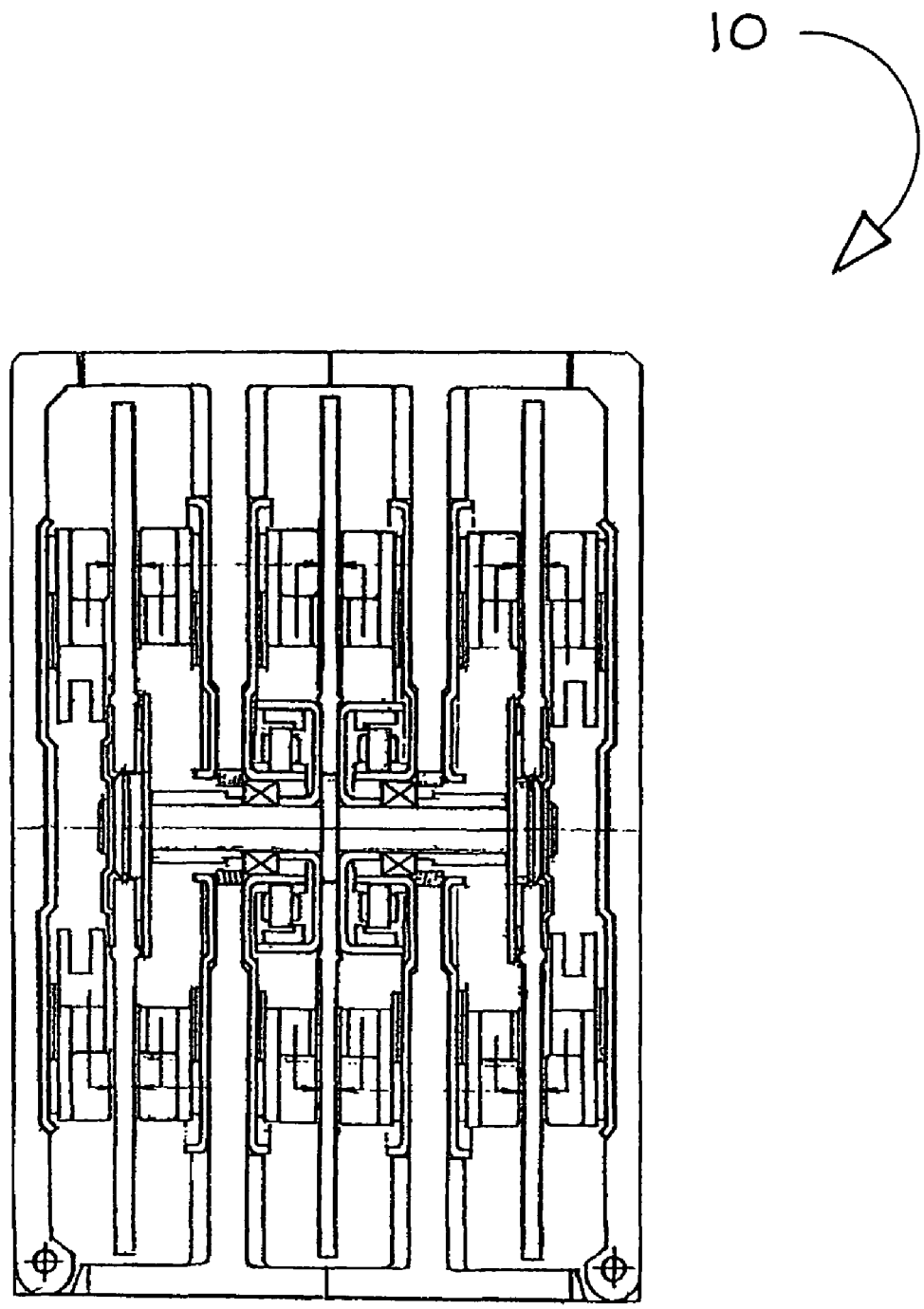
FIG. 6b is a sectional side view illustrating the multiple positioner drive, constructed in accordance with the present invention, having a single fixed disk, two (2) removable disks, a minimum of two (2) positioners per side, and a dual stator/rotor spindle motor with multiple positioners mounted on both sides of the removable disks.
Figure 6C:
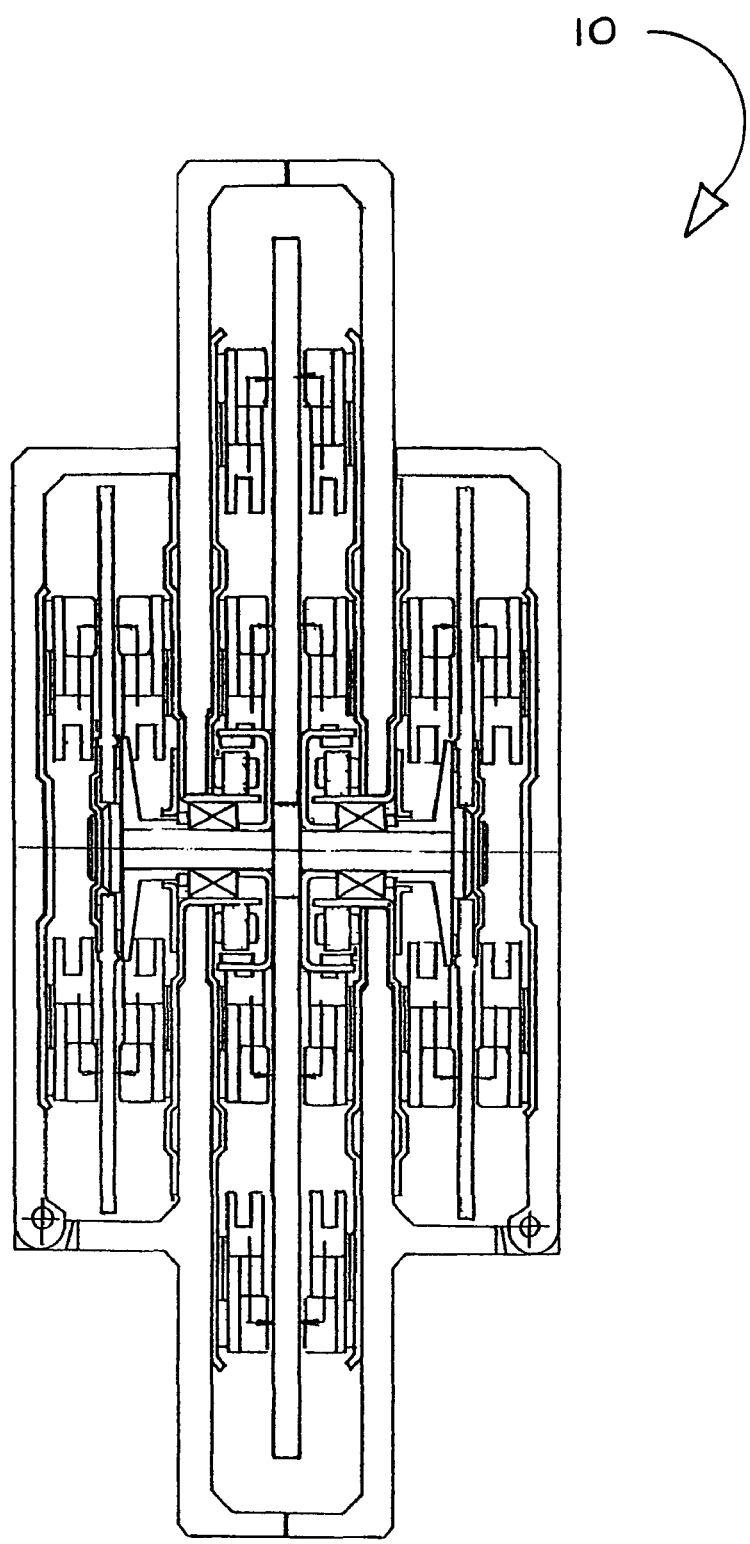
FIG. 6c is a sectional side view illustrating the multiple positioner drive, constructed in accordance with the present invention, having a single fixed disk, two (2) removable disks, a minimum of two (2) positioners per side, and a dual stator/rotor spindle motor with the fixed disk having a diameter of eight (8") inches.

As illustrated in FIGS. 6a-6c, the multiple positioner device 10 of the present invention has a single fixed disk, two (2) removable disks, a minimum of two (2) positioners per side, and a dual stator/rotor spindle motor with single shaft. The fixed disk can be 120 mm optical media or magnetic media or other. Multiple positioners are mounted on both sides of fixed disk and single side of removable disks. Referring to FIG. 6a, each of the two (2) removable disks have multiple positioners on both sides. FIG. 6b is similar to FIG. 6a except multiple positioners are mounted on both sides of the removable disks. FIG. 6c is similar to FIG. 6b except the fixed disk has a diameter of eight (8") inches and can be either optical or magnetic.

As illustrated in FIG. 6a, dual removable disks are affixed at each end to a single shaft driven by a dual stator/rotor spindle motor. For illustration purposes, standard DVD media is used (120 mm and mini). This configuration is not limited to DVD media or to the sizes shown. The removable media can be 'ROM' (read only memory), WROM (write once, ready many times), R/W (read and writeable), or holographic and either single sided or dual sided. With each disk there exists a minimum of a single positioner per side to multiples of positioners per side.

As illustrated in FIGS. 6b and 6c, one (1) fixed data disk affixed to a single shaft with two (2) removable data disks, one at each end also affixed to the same shaft. The fixed and removable data disks are driven either by a dual stator/rotor spindle motor, single shaft or by a quadruple stator/rotor spindle motor, single shaft. For illustration purposes, standard DVD media (120 mm and mini), 5¼-inch diameter, and eight (8") inch diameter media are used. These configurations are not limited to these sizes shown. The removable media can be 'ROM' (read only memory), WROM (write once, ready many times), R/W (read and writeable), or holographic and either single sided or dual sided. The fixed disk can be magnetic hard disks, rewritable optical disks, rewritable magneto-optical disks, or rewritable holographic disks. Within each disk there exists a minimum of a single positioner per side to multiples of positioners per side.

Figure 7A:
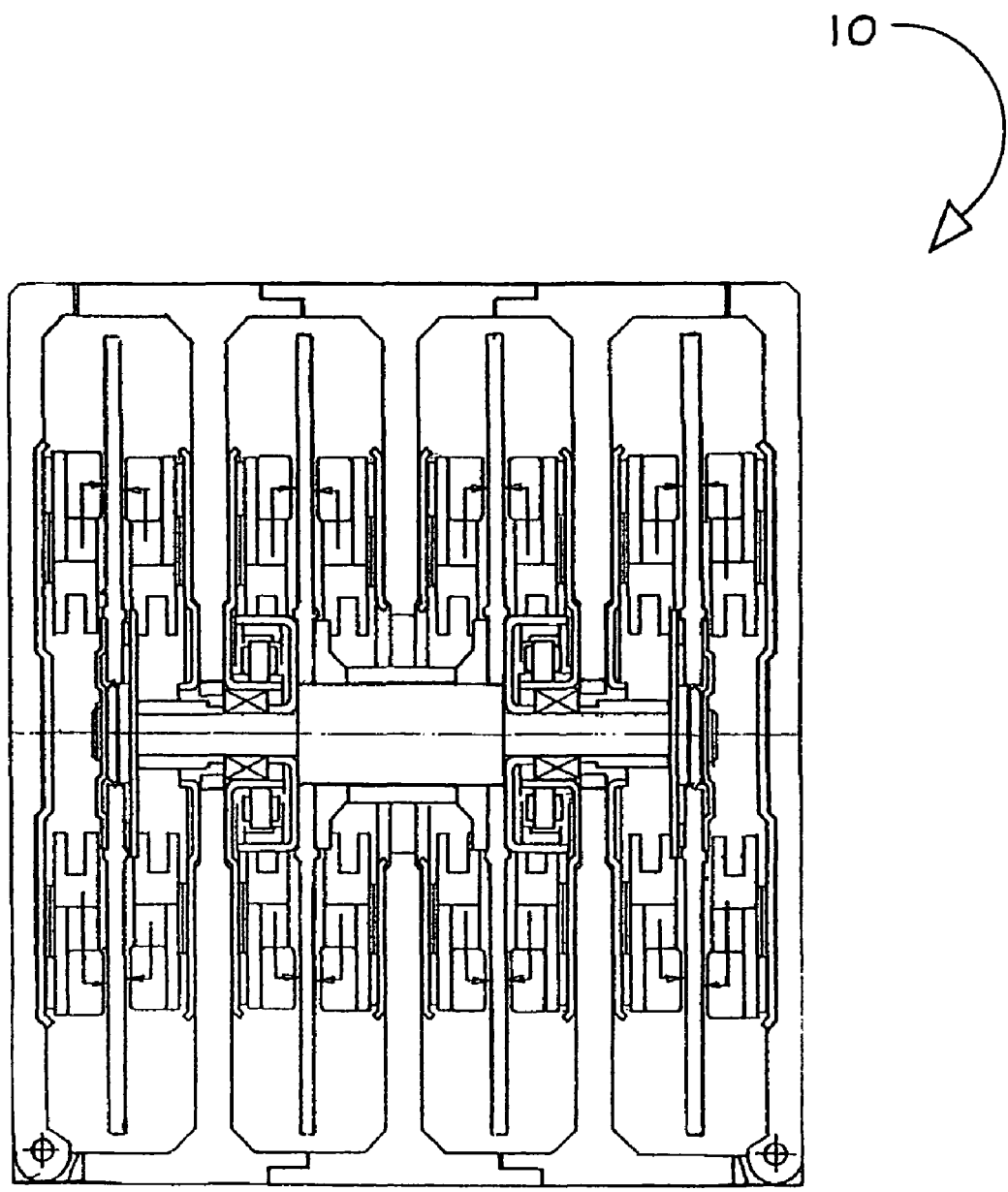
FIG. 7a is a sectional side view illustrating the multiple positioner drive, constructed in accordance with the present invention, having two (2) fixed disks, two (2) removable disks, and a minimum of two (2) positioners per side.
Figure 7B:
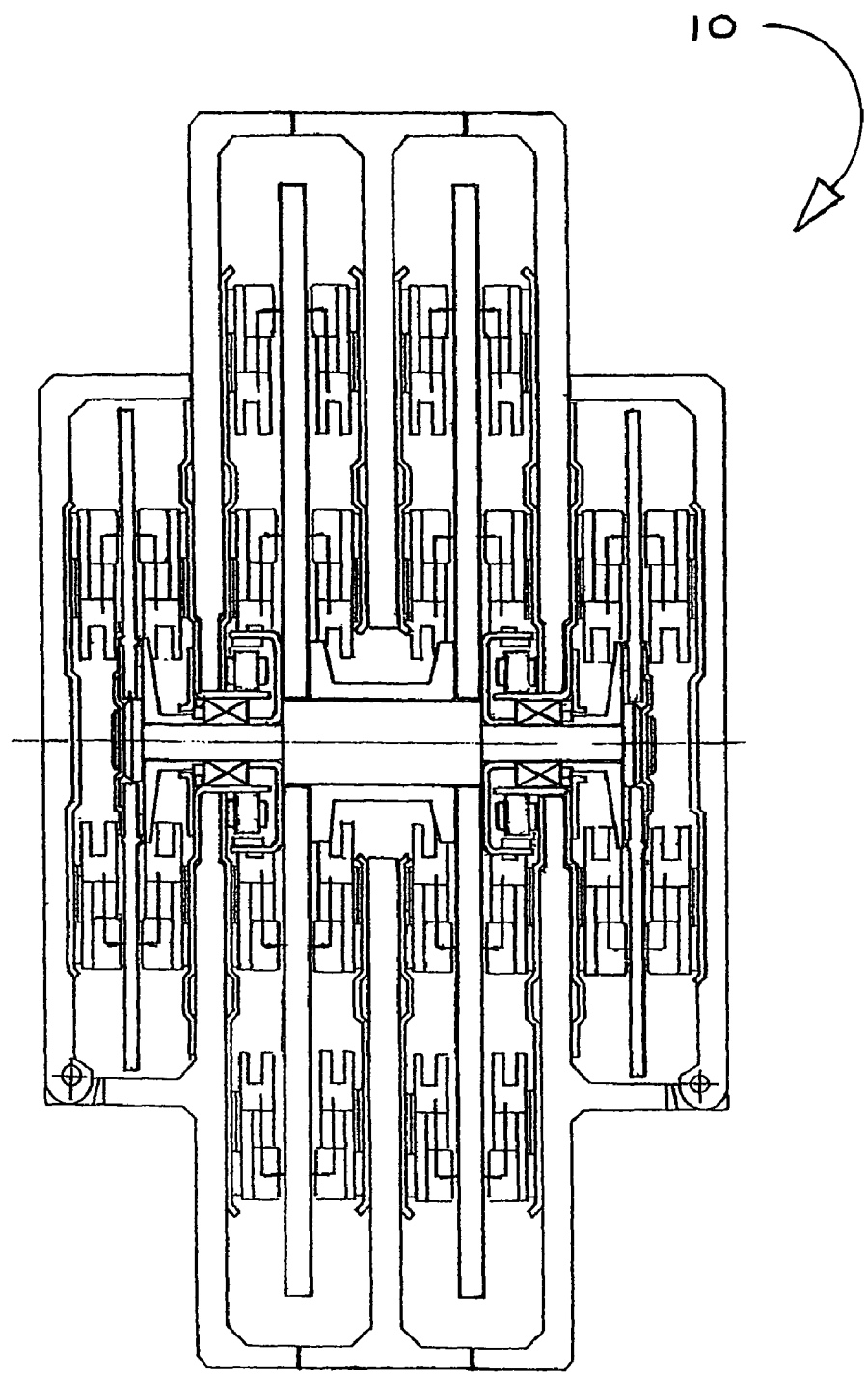
FIG. 7b is a sectional side view illustrating the multiple positioner drive, constructed in accordance with the present invention, having two (2) fixed disks.

As illustrated in FIGS. 7a and 7b, the multiple positioner device 10 of the present invention has two (2) fixed disks, two (2) removable disks, and a minimum of two (2) positioners per side. FIG. 7a is similar to FIG. 6b except the data storage device has two (2) fixed disks. FIG. 7b is similar to FIG. 7a except the data storage device has two (2) fixed disks. The number of fixed disks is only limited by the strength of the single shaft and the size of the multiple stator/rotor spindle motor. These configurations are virtual flywheels of fast data transfer and many inputs/outputs per second.

Figure 8A:
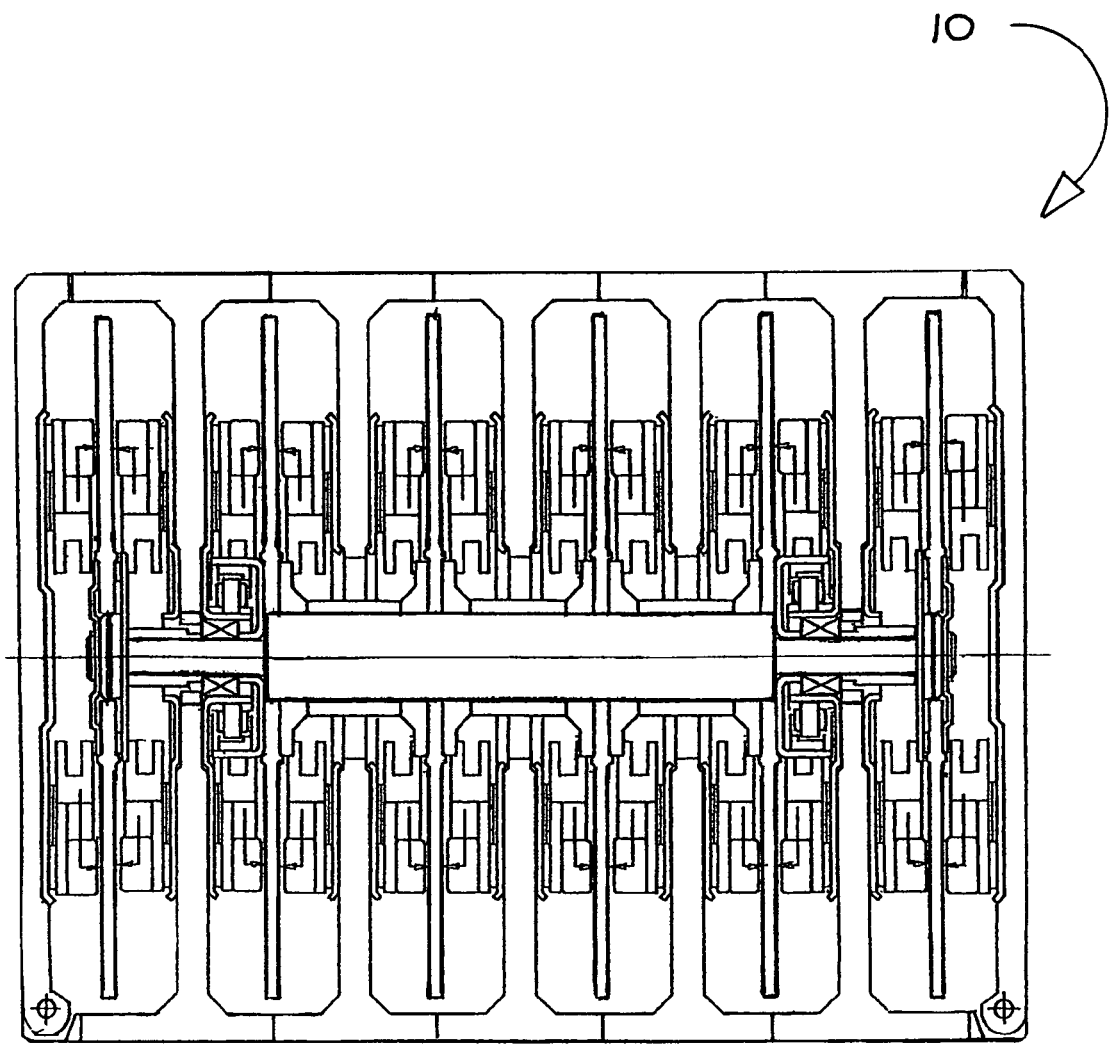
FIG. 8a is a sectional side view illustrating the multiple positioner drive, constructed in accordance with the present invention, having four (4) fixed disks, two (2) removable disks, and a minimum of two (2) positioners per side with multiple positioners on both sides of the removable disks.
Figure 8B:
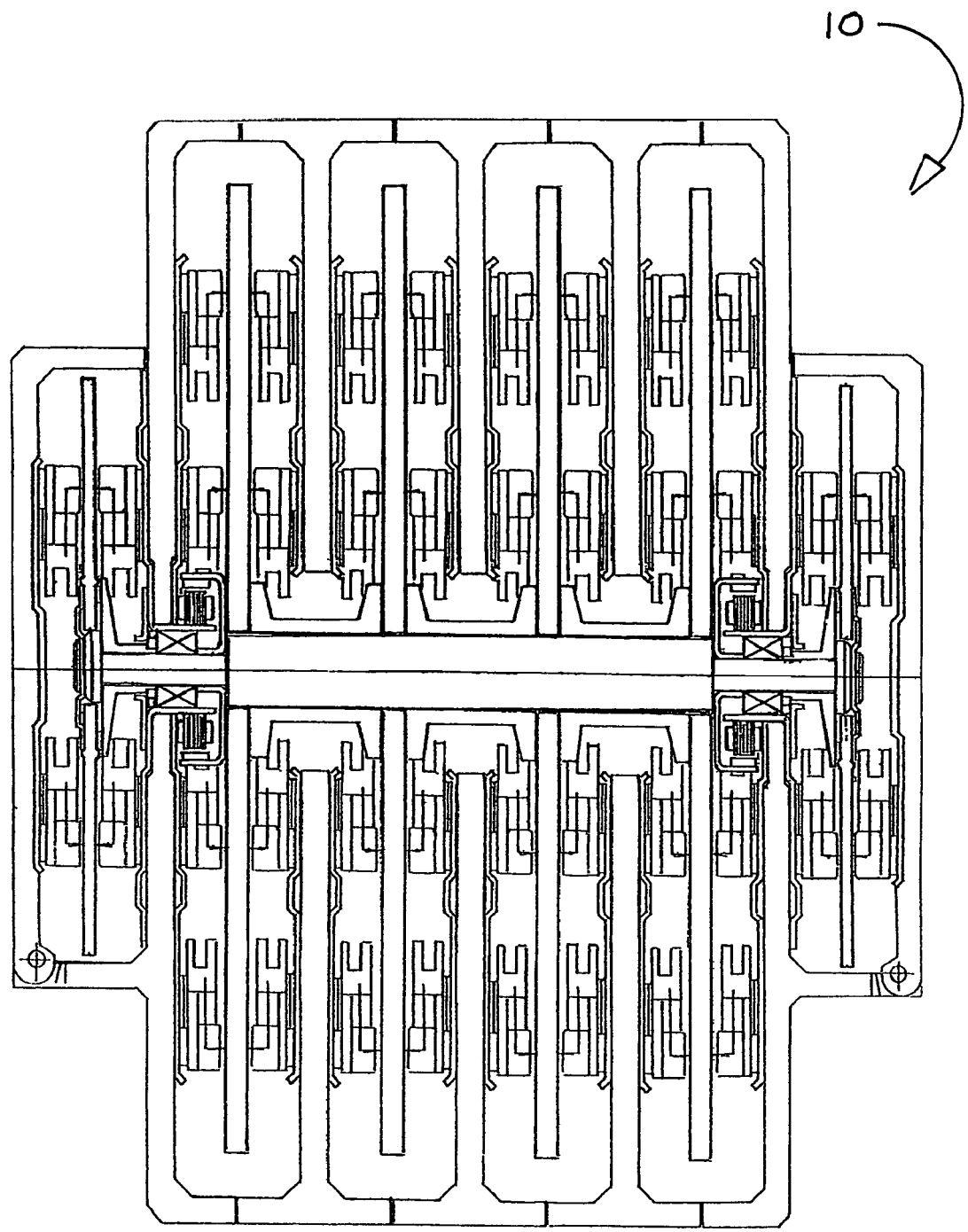
FIG. 8b is a sectional side view illustrating the multiple positioner drive, constructed in accordance with the present invention, having four (4) fixed disks, two (2) removable disks, and a minimum of two (2) positioners per side with four (4) fixed disks.

As illustrated in FIGS. 8a and 8b, the multiple positioner device 10 of the present invention has four (4) fixed disks, two (2) removable disks, and a minimum of two (2) positioners per side. FIG. 8a illustrates multiple positioners on both sides of the removable disks. FIG. 8b illustrates four (4) fixed disks. The lumber of fixed disks is only limited by the strength of the single shaft and the size of the multiple stator/rotor spindle motor. These configurations are virtual flywheels of fast data transfer and many inputs/outputs per second.

Figure 9:
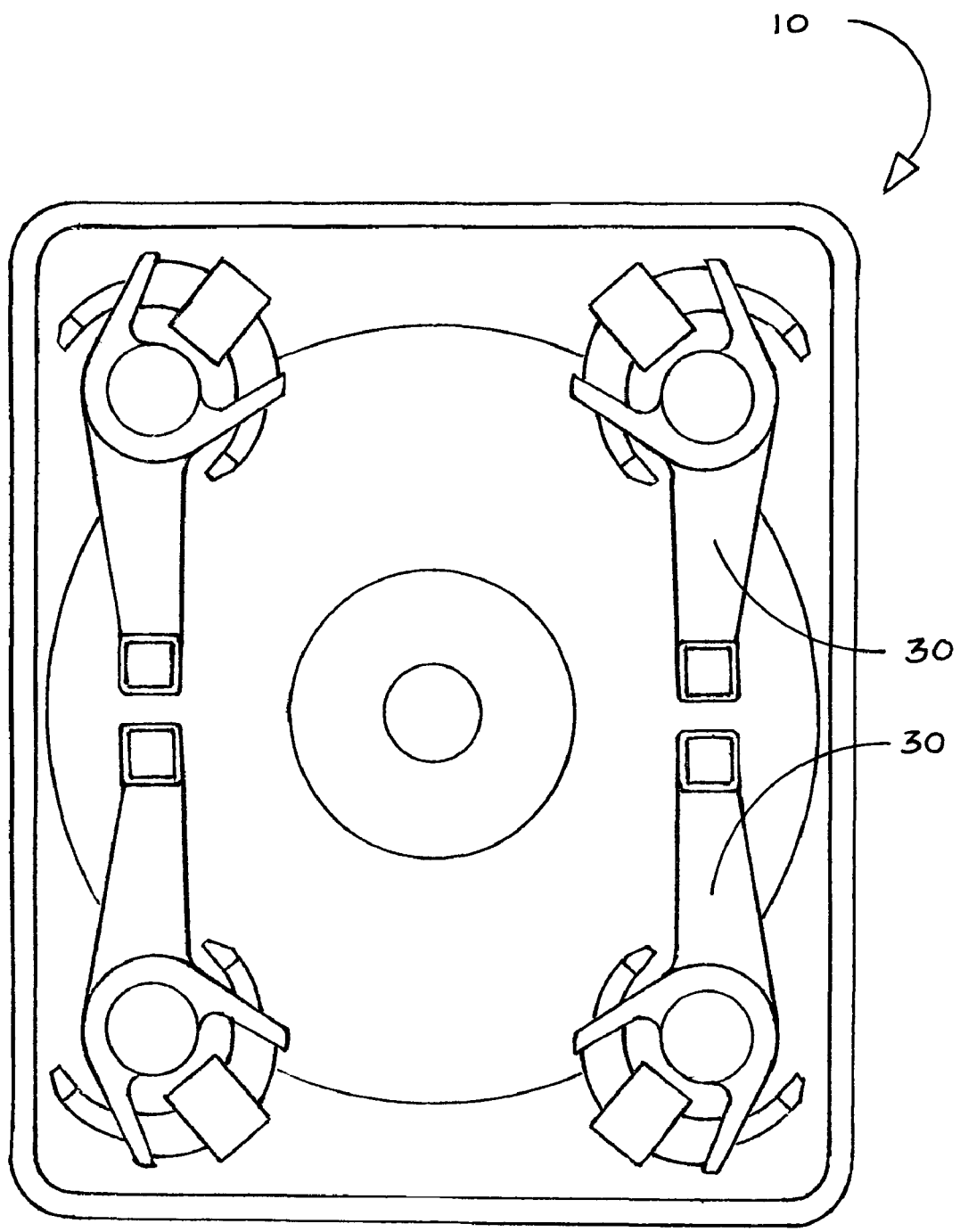
FIG. 9 is a top plan view illustrating a drive device of the multiple drive device, constructed in accordance with the present invention.

As illustrated in FIG. 9, the multiple positioner device 10 of the present invention has two positioners 30 on each side facing each other creating fast latency in the microsecond range. The positioners 30 are arranged in pairs opposed to each other creating fast response for verifying written data. As illustrated, positioner one writes and positioner two reads and verifies the data in $\frac{1}{15}^{th}$ of a revolution which is many times faster than any existing data storage device that exists today. The illustrations depict many sizes and quantities of pairs of opposed positioners.

With positioners 30 positioned face to face as illustrated herein, latency (write then read verify the written data) can be derived in $\frac{1}{15}^{th}$ of a revolution which is "fifteen (15) times" faster than any conventional data storage device in the industry today. Also, by utilizing over and under rotary positioners mounted as over and under pairs, and as illustrated in the drawing pages, latency goes from $\frac{1}{6}^{th}$ to $\frac{1}{12}^{th}$ of a revolution which is six to twelve times faster latency than an conventional data storage device in the industry.

Each positioner in the present invention preferably incorporates multi-beam technology—the ability to read or write many tracks simultaneously per positioner. This feature increases the data transfer speed and data input and output per second by the number of positioners in position times the number of beams reading or writing data simultaneously.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A data storage device comprising:
   a first fixed disk;
   at least two removable disks, each of the first fixed disk and two removable disks rotating about the same shaft; and
   at least two positioners reading data from and writing data to each side of the fixed disk and the removable disks.

2. The data storage device of claim 1 wherein the at least two removable disks are affixed at each end to a single shaft driven by a dual stator/rotor spindle motor.

3. The data storage device of claim 1 wherein the first fixed disk and each removable disk is affixed to a single shaft driven by mechanism selected from the group consisting of a dual stator/rotor spindle motor, single shaft, and a quadruple stator/rotor spindle motor, single shaft.

4. The data storage device of claim 3 and further comprising:
   a second fixed disk.

5. The data storage device of claim 4 and further comprising:
   a third fixed disk; and
   a fourth fixed disk.

6. A data storage device comprising:
   a first fixed disk;
   a first removable disk; and
   a first positioner reading data from and writing data to a first side of the first fixed disk;
   a second positioner reading data from and writing data to a second side of the first fixed disk;
   a third positioner reading data from and writing data to a first side of the first removable disk; and
   a fourth positioner reading data from and writing data to a second side of the first removable disk;
   wherein each of the disks are rotatable along a single first shaft; and
   wherein each of the positioners is rotatable along a single second shaft.

7. The data storage device of claim 6 and further comprising:
   additional fixed disk positioners for reading data from and writing data to each side of the first fixed disk; and
   additional removable disk positioners for reading data from and writing data to each side of the first removable disk;
   wherein the additional fixed disk positioners and the additional removable disk positioners are mounted for rotation along a single common shaft.

8. The data storage device of claim 6 and further comprising:
   a second removable disk with a positioner for reading data from and writing data to a first side of the second removable disk and a positioner for reading data from and writing data to a second side of the second removable disk;
   wherein the second removable disk is mounted for rotation the single first shaft.

9. The data storage device of claim 8 and further comprising:
   additional removable disk positioners for reading data from and writing data to each side of the second removable disk.

10. The data storage device of claim 6 and further comprising:
    multiple fixed disks rotatable along the single first shaft.

11. The data storage device of claim 1 wherein the positioners allow multiple input/output data streams in parallel.

12. The data storage device of claim 1 wherein the positioners are rotated by dual coil/dual moving magnet actuators.

* * * * *